United States Patent
Beale et al.

(10) Patent No.: US 6,204,941 B1
(45) Date of Patent: Mar. 20, 2001

(54) OPTICAL FILTERING DEVICE

(75) Inventors: Marc I J Beale; Meirion F Lewis, both of Worcester (GB)

(73) Assignee: The Secretary of State for Defence in Her Britannic Majesty's Government of the United Kingdom of Great Britain and Northern Ireland, Farnborough (GB)

(*) Notice: Subject to any disclaimer, the term of this patent is extended or adjusted under 35 U.S.C. 154(b) by 143 days.

(21) Appl. No.: 08/745,178

(22) Filed: Nov. 7, 1996

Related U.S. Application Data

(63) Continuation of application No. 08/088,282, filed on Jun. 29, 1993, now abandoned.

(30) Foreign Application Priority Data

Jul. 9, 1992 (GB) .................................. 9214556

(51) Int. Cl.[7] ................................. G01J 3/06; G01J 3/42
(52) U.S. Cl. ............................ 359/66; 359/890; 356/310; 356/330
(58) Field of Search ................. 359/66, 67, 68, 359/885, 890; 356/310, 326, 330, 402

(56) References Cited

U.S. PATENT DOCUMENTS

| | | | | |
|---|---|---|---|---|
| 3,620,597 | * | 11/1971 | Schwartz et al. ............... | 359/68 |
| 3,623,795 | * | 11/1971 | Taylor et al. .................... | 359/68 |
| 3,751,133 | * | 8/1973 | Nishino ............................. | 359/722 |
| 4,007,989 | * | 2/1977 | Wajda ................................ | 356/96 |
| 4,497,540 | * | 2/1985 | Breckinridge et al. ......... | 356/330 |
| 4,660,975 | * | 4/1987 | Aughton ........................... | 356/308 |
| 4,790,654 | * | 12/1988 | Clarke .............................. | 356/330 |
| 5,090,807 | * | 2/1992 | Tai ................................... | 356/310 |
| 5,208,674 | * | 5/1993 | Setchell ........................... | 358/209 |
| 5,315,423 | * | 5/1994 | Hong ................................ | 359/722 |
| 5,442,438 | * | 8/1995 | Batchelder et al. ............. | 356/326 |

OTHER PUBLICATIONS

PARPA—US Army Advanced Laser Protection Program, Mar. 1989, pp. 1–99.*

* cited by examiner

Primary Examiner—Nelson Moskowitz
(74) Attorney, Agent, or Firm—Nixon & Vanderhye P.C.

(57) ABSTRACT

An optical filtering device incorporates first and second prisms, the latter prism counteracting the angular dispersion of the former prism. A spatial light modulator provides a positionally variable optical stop located to block radiation within a wavelength interval and received from a location within a scene. Unobscured radiation from that and other scene locations passes to a camera, which produces an image on a display. Opaque pixels in the stop are positioned to block unwanted light sources. The invention attenuates potentially dazzling monochromatic radiation while retaining radiation at other wavelengths for imaging purposes.

15 Claims, 6 Drawing Sheets

OPTICAL FILTERING DEVICE

This application is a continuation of Ser. No. 08/088,282 filed Jun. 29, 1993 now abandoned.

BACKGROUND OF THE INVENTION

1. Field of the Invention

This invention relates to an optical filtering device. More particularly, although not exclusively, it relates to a device suitable for selectively reducing the intensity of unwanted radiation in an optical system, such as that arising from a high intensity monochromatic localised source.

2. Discussion of Prior Art

Dazzle produced by high intensity radiation sources is a common problem in optical systems such as imaging devices. United Kingdom Patent No. 1,115,864 describes a gas cell used to protect a radiation detector against damage from high intensity radiation. The pressure of gas in the cell is such that, at sufficiently high radiation intensity, the gas breaks down into a plasma which scatters and attenuates unwanted radiation. However, such an arrangement provides no improvement in imaging performance in the presence of a dazzling source. It merely provides protection against damage. There is for example a need for a device capable of selectively blocking radiation from a high intensity source, while allowing other radiation from a scene containing such a source to be collected for use in imaging. Optical apparatus having a need for such a device includes television and film cameras, binoculars, night sights, flying helmets, safety goggles and optical instruments incorporating sensitive detectors.

SUMMARY OF THE INVENTION

It is an object of the invention to provide an optical filtering device.

The present invention provides an optical filtering device including dispersing means arranged to provide spatial dispersion as a function of wavelength without substantial angular dispersion, and a stop arranged to provide capability for blocking at least one wavelength interval from at least one direction of radiation incident on the device.

The invention provides the advantage that a radiation wavelength interval from a scene location may be blocked while radiation of other wavelengths from the same scene location remains unblocked. For example, high intensity monochromatic radiation from a localised source such as a laser may be blocked to avoid dazzle or damage.

The invention may include means for forming an image from spatially dispersed radiation from the dispersing means and from which the said at least one wavelength interval has been blocked by the stop. This provides an imaging device capable of removing for example monochromatic sources of dazzle or damage from an imaged scene while retaining capability for producing images of such sources at unblocked wavelengths. An observer may then "look past" a source of dazzling radiation.

The dispersing means may comprise a first dispersing element and a second dispersing element arranged to counteract angular dispersion introduced by the first.

The dispersing elements may be prisms, and may be arranged in combination with reflecting means to define a folded light path.

Alternatively, the dispersing elements may be diffraction gratings arranged in combination with a subsidiary stop to inhibit unwanted radiation reaching the image forming means.

The stop may be an electronically controlled spatial light modulator such as a liquid crystal device arranged for selective addressing of individual pixels. The invention may include image forming means arranged to provide feedback control over obscuration introduced by the stop, as appropriate for selective attenuation of radiation from a monochromatic source producing dazzle in an imaged scene.

The invention may include means for producing an intermediate focus in an optical path between first and second dispersing elements of the dispersing means.

BRIEF DESCRIPTION OF THE DRAWINGS

In order that the invention might be more fully understood, embodiments thereof will now be described, with reference to the accompanying drawings, in which.

DETAILED DISCUSSION OF PREFERRED EMBODIMENTS

Figure 1:
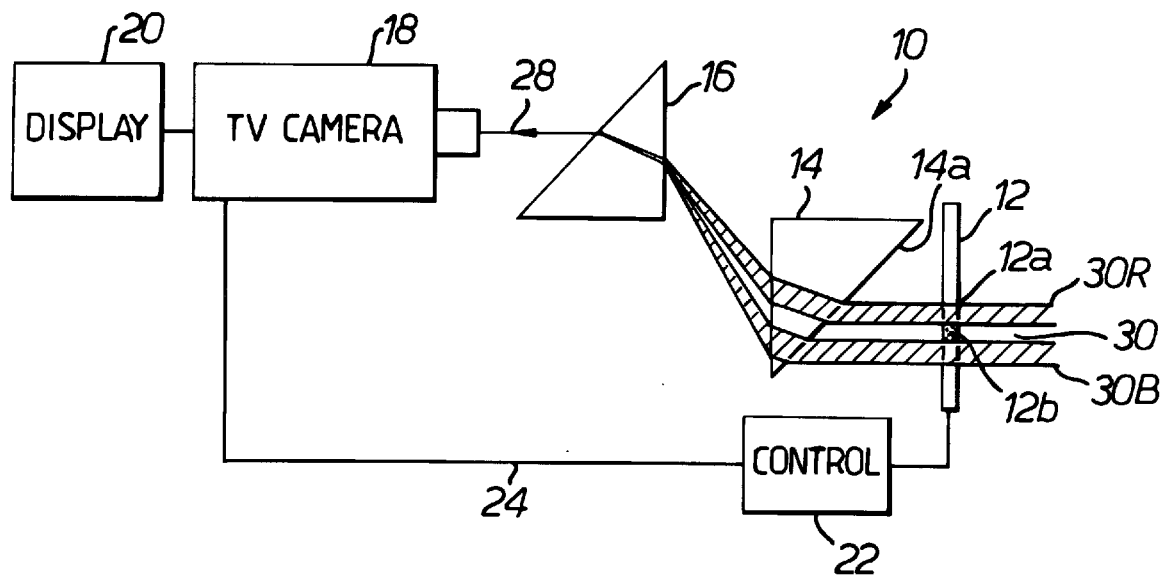
FIG. 1 is a schematic drawing of an optical filtering device of the invention.

Referring to FIG. 1, there is shown a schematic drawing of an optical filtering device of the invention indicated generally by 10. The device 10 incorporates an optical stop 12, first and second prisms 14 and 16, a closed circuit television camera 18 and associated display 20, together with a control unit 22 connected in a feedback loop 24 between the camera 18 and the optical stop 12. The prisms 14 and 16 are of like size, shape, composition and dispersion, and are disposed so that their angular dispersions are mutually parallel but opposite. They are right isosceles triangular in section. The camera 18 incorporates an objective lens (not shown) with a 100 mm focal length. This lens is arranged to receive light indicated by a central white light ray 28 from a remote scene region (not shown) via the prisms 14 and 16.

The optical stop 12 is a liquid crystal spatial light modulator having transparent pixels exemplified by a single pixel 12*a* and opaque pixels exemplified by a single pixel 12*b* (dark square). The stop 12 may switch any of its pixels to a blocking state; ie it may provide a plurality of individual spaced apart opaque pixels, or a contiguous opaque pixel cluster, or a single opaque pixel, or a combination of two or more of these. The pixels 12*a* and 12*b* are shown enlarged for clarity. The modulator or stop 12 has 64 such pixels forming a one-dimensional rectilinear array. The positions of opaque pixels such as 12*b* are controlled by output signals from the control unit 22.

The optical filtering device 10 operates as follows. Light incident on a first face 14a of the first prism 14 from the remote scene is angularly dispersed. The light then passes to the second prism 16, which is arranged to counteract the angular dispersion introduced by the first prism, and to cancel it as nearly as possible. The first and second prisms in combination produce a spatial, wavelength dependent dispersion of light from the remote scene.

When projected back through the prisms 16 and 14, the central ray 28 corresponds to a spatially dispersed input light beam 30 having an upper red ray 30R and a lower blue ray 30B; intervening rays (not shown) are of other colours in the visible region of the spectrum. All rays of the beam 30 which contribute to the ray 28 are parallel to one another, because the prisms 14 and 16 counteract one another accurately. Any opaque pixel such as the pixel 12b blocks part of this spectrum. As illustrated by way of example, the pixel 12b is located centrally of the beam 30, and consequently the green region of this beam is blocked. The central light ray 28 entering the camera 18 has therefore had green light removed from it by the optical stop 12. The size and position of an opaque pixel controls the extent and location of the associated radiation wavelength interval which is blocked, and the number of opaque pixels dictates the number of such intervals.

The camera 18 is arranged to provide a feedback signal to the control unit 22, which responds by supplying a control signal to the optical stop 12. In consequence the pixels selected to be opaque automatically relocate to block a source when required by change in its location or wavelength. Thus a different part of the visible spectrum in the beam 30 may become blocked. The camera 18 is arranged to provide negative feedback, so that an undesirably intense region of the visible spectrum in the beam 30 is counteracted by activation of opacity in correspondingly located pixels of the optical stop 12.

White light rays (not shown) inclined to the central ray 28 are accepted by the camera 18. Each such ray is associated with a respective part of the remote scene; it has a respective dispersed beam (not shown) inclined to and displaced from the beam 30. In consequence, removal of green light from the beam 30 also removes other light wavelength intervals from other parts of the remote scene; eg loss of green light from one part of the scene might correspond to loss of red light from another. However, the filtering device 10 provides the important benefit that undesirably high intensity light of a specific wavelength interval from one part of a remote scene may be attenuated, thus avoiding camera dazzle. Furthermore, the invention retains what is referred to as "look-past" capability, in that wavelengths outside the respective obscured interval in each case are permitted to reach the camera 18 from each part of the remote scene. Consequently, each part of the scene remains visible on the display 20 with the unobscured part of the imaging spectrum, despite the obscuration of any narrow bandwidth light source. If the display 20 provides a black and white (strictly speaking greyscale) image, there is little visible effect from the blocking introduced by the optical stop 12. If however the display 20 is in colour, the blocked wavelength interval will vary in location in the spectrum as position in the scene varies. This still leaves a useful colour image from which narrow bandwidth dazzle has been removed. In short, all of the scene remains visible at some wavelengths.

A device similar to that shown in FIG. 1 was employed for test purposes. The test device lacked the control unit 22 and feedback loop 24, and had a manually adjustable stop 12. The camera 18 had an objective lens with 100 mm focal length. A monochromatic laser with sufficient intensity to produce camera dazzle was positioned in the field of view of the camera. The test device produced a good image with negligible degradation from which laser dazzle had been blocked. The laser itself was clearly imaged by virtue of the unobscured part of the spectrum. This demonstrated the capability of the invention to "look past" a dazzling monochromatic source. Furthermore, the test device was characterised by negligible image distortion, having regard to normal imaging requirements.

The manually adjustable test device provides an embodiment of the invention suitable for applications not requiring a rapid response to dazzle. For example, imaging devices such as telescopes may incorporate apparatus equivalent to the test device and be manually adjustable to remove dazzle.

The invention may be required for use with conventional cameras which do not provide an output signal suitable for input to a control unit 22, but for which electronic feedback would be desirable. In this case the device 10 of FIG. 1 may incorporate a beamsplitter, imaging apparatus, an array of detectors and circuitry for providing an appropriate signal to the control unit 22. The beamsplitter is located to divert a proportion of the input light beam 30 to the imaging apparatus for imaging on to the detector array. The array locates dazzling objects in an imaged scene, and supplies a control signal to the unit 22 to block the unwanted dazzle by means of the stop 12.

Figure 2:
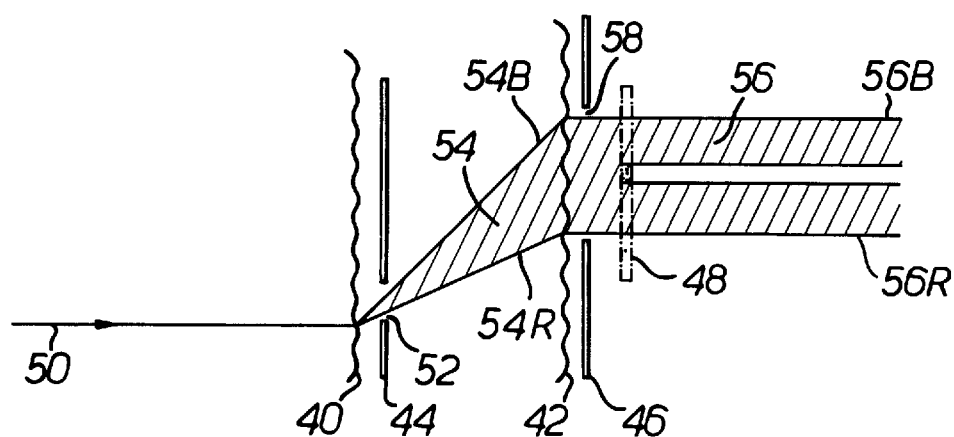
FIG. 2 schematically illustrates diffraction gratings for use in a device of the invention.

In an alternative embodiment of the invention, the prisms 14 and 16 are replaced by diffraction gratings, and the stop 12 may be relocated. This is shown in FIG. 2, which also shows the effect produced by such an arrangement on incident white light. This drawing schematically shows first and second diffraction gratings 40 and 42 together with first and second fixed optical stops 44 and 46, and a selective optical stop 48.

The arrangement shown in FIG. 2 receives white light indicated by a ray 50 from a remote scene (not shown). The ray 50 is diffracted and thereby angularly dispersed by the first grating 40 in accordance with the following well known grating equation:

$$\sin \alpha + \sin \beta = n\lambda/d \qquad (1)$$

where:

$\alpha$ and $\beta$ are respectively the angles of incidence and diffraction at the first grating; as illustrated $\alpha$ is equal to $\pi/2$;

$\lambda$ is the wavelength of incident light;

d is the grating line spacing; and n is any integer, positive or negative, or zero.

The first grating 40 is blazed in positive first order, ie n in Equation (1) is +1. The first fixed stop 44 has a single aperture 52 which transmits only visible light diffracted in the first order of the first grating 40. The stop 44 consequently defines an angularly dispersed divergent beam 54 having outer limits defined by a blue ray 54B and a red ray 54R.

The divergent beam 54 is incident on the second grating 42, which is blazed in negative first order and accurately counteracts the dispersion introduced by the first grating 40. In consequence, the second grating 42 in first order transmits a beam 56 in which angular dispersion is substantially zero. The transmitted beam 56 has parallel red and blue rays 56R and 56B with rays of intervening colours therebetween.

The second optical stop 46 blocks all transmitted light other than that in grating negative first order, and has an aperture 58 to transmit the latter. The selective optical stop 48 has an opaque pixel 48b which blocks transmission of green light. Light of other wavelengths is transmitted by the selective stop 48; it passes to a camera (not shown) equivalent to the camera 18 and arranged to control the selective stop by feedback as previously described.

The inclinations of the rays 54R and 54B to the axis 50 depend on diffraction grating characteristics. If the first diffraction grating has 900 lines/mm, a field of view of at least 20° is achievable while blocking undiffracted light (zeroth order, n=0). It may not be necessary to block other unwanted orders such as n=2 if they have low intensity.

Whereas the gratings 40 and 42 are blazed in first order, it is also possible to employ gratings blazed in a higher order with appropriate optical stops to block unwanted light.

Figure 3:
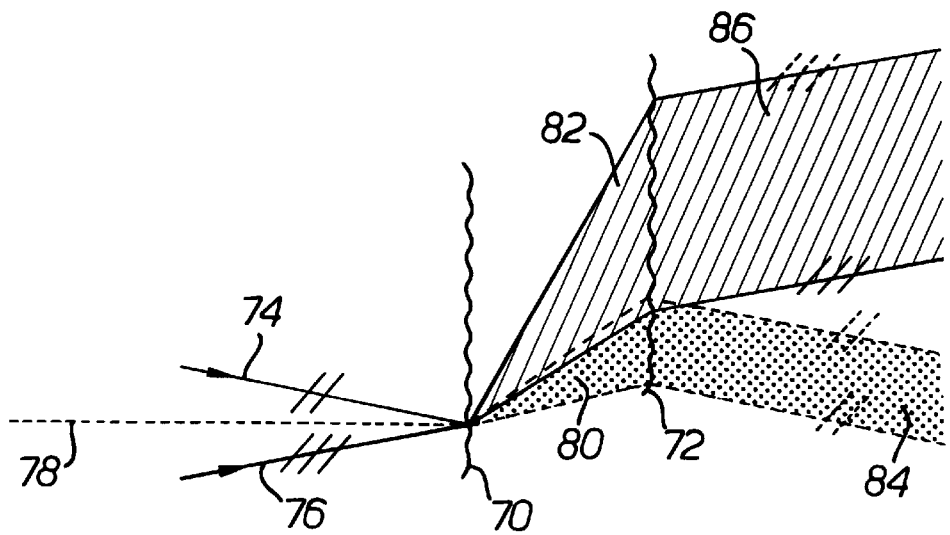
FIG. 3 illustrates dispersion of white light rays in two diffraction gratings arranged such that angular dispersion in one grating is counteracted in the other.

FIG. 3 illustrates the effects produced on off-axis white light by two gratings 70 and 72 equivalent to those described with reference to FIG. 2. Upper and lower white light rays 74 and 76 which are inclined to an optical axis 78 are incident on the first grating 70. These rays correspond to light from different parts of a distant scene. They are angularly dispersed to form respective divergent beams 80 and 82 for incidence on the second grating 72. The latter converts the divergent beams 80 and 82 to parallel beams 84 and 86 respectively. For illustrational simplicity, optical stops have been omitted and so also have all diffracted beams other than that for n values of +1 at the first grating 70 and −1 at the second grating 72. FIG. 3 demonstrates that white light rays from different parts of a remote scene give rise to respective parallel beams with an angular separation between them. A lens (not shown) is required for image formation, such as the objective lens of the camera 18.

Figure 4:
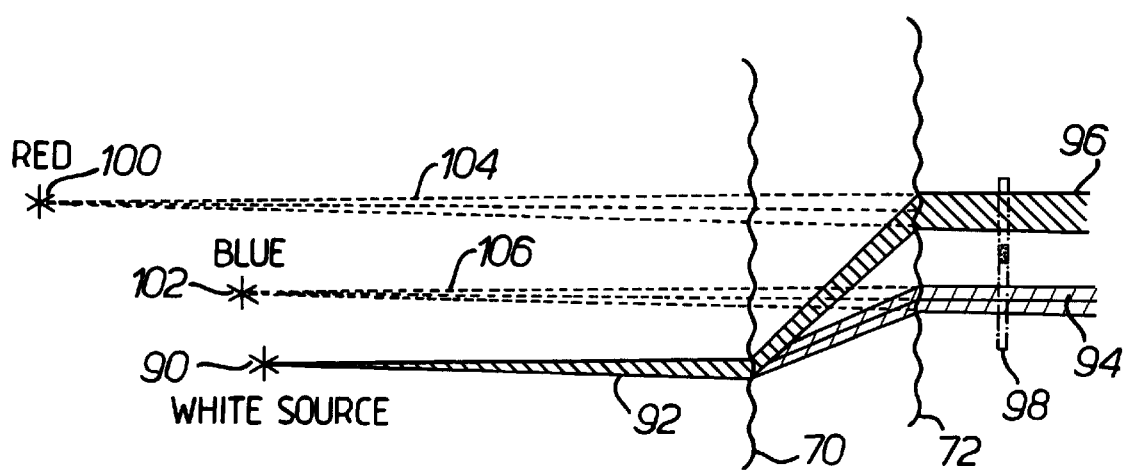
FIG. 4 shows virtual images of a white light source produced by two diffraction gratings.

Referring now also to FIG. 4, imaging properties of the gratings 70 and 72 are illustrated schematically. A white light source produces a divergent white light beam 92 incident on the first grating 70. Angular dispersion in the first grating 70 and counteraction thereof in the second grating 72 produces divergent red and blue beams 94 and 96 which form virtual images of the point source 90. Beams of intervening wavelengths are not shown. A selective stop 98 is arranged for controllable wavelength interval blocking as described earlier.

The red and blue beams diverge from virtual images 100 and 102 as indicated by dotted lines 104 and 106. These images may be viewed by using a lens to focus the beams 94 and 96. FIG. 4 demonstrates that a white light source gives rise to multiple coloured images in a system incorporating mutually counteracting wavelength dispersive elements in the form of gratings 70 and 72. One or more of these coloured images can be removed by controlling the selective stop 98 to introduce one or more opaque pixels. The spatial dispersion introduced by the gratings 70 and 72 causes aberration which is negligible for remote scenes, although it becomes progressively more significant as the object distance reduces. The spatial dispersion is similar in magnitude to the separation between the gratings 70 and 72, ie in the order of a few centimeters. For objects tens of meters away, the lateral smearing of a few centimeters according to wavelength is not apparent, since it is less than the spatial resolution of the system. FIG. 4 illustrates the lateral separation of virtual images of a light source very close to a device of the invention as an example of wavelength smearing.

Figure 5:
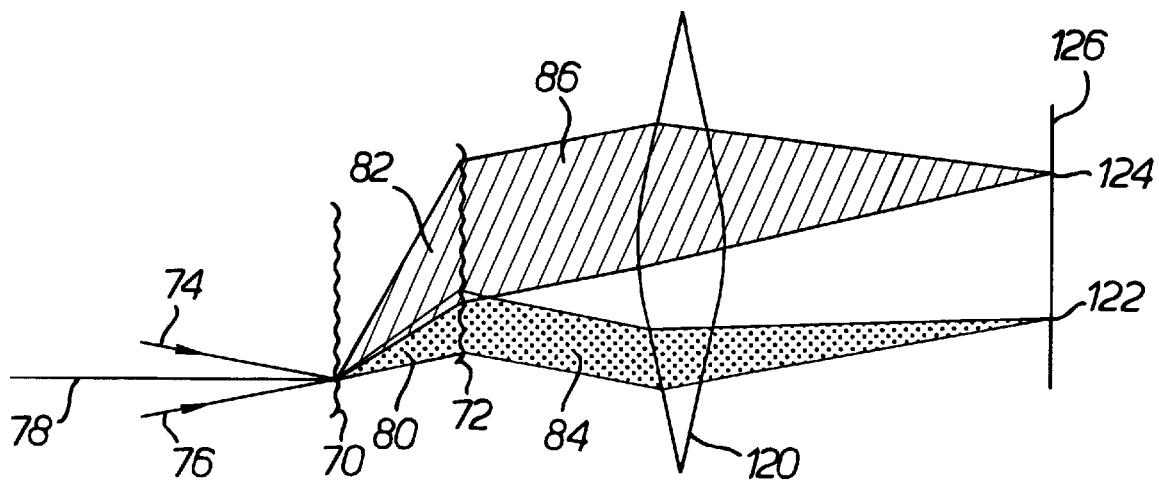
FIG. 5 shows the FIG. 3 arrangement with the addition of an imaging forming lens.

Referring now also to FIG. 5, the grating arrangement and ray diagram of FIG. 3 is shown once more with the addition of a focussing lens 120. Elements previously described are like referenced. The lens 120 brings each of the beams 84 and 86 to a respective focus 122 or 124 in a focal plane 126. The lens 120 may be the objective lens of a camera and the focal plane 120 may be occupied by an array of detecting elements. The location of each of the foci 122 and 124 is dependent on the angle of incidence of the respective rays 74 and 76. This demonstrates that a pair of mutually counteracting dispersive elements may be incorporated in an imaging system in accordance with the invention.

Figure 6:
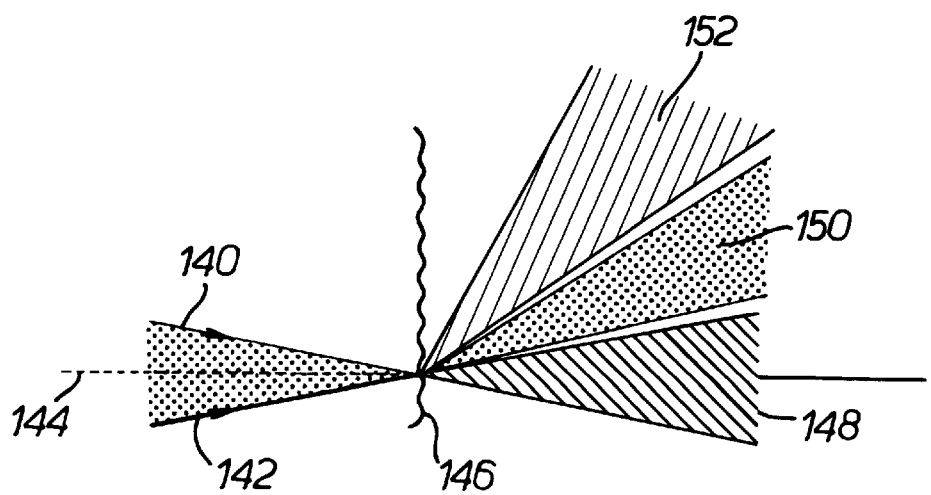
FIG. 6 illustrates transmission of undiffracted light by a grating.

FIG. 6 schematically illustrates the desirability of blocking unwanted white light (zero order diffraction) in a device of the invention. A theoretically ideal diffraction grating diffracts with 100% efficiency into a prearranged diffraction order; however, a practical grating produces undiffracted light and unwanted diffraction orders in addition to a desired order. White light rays 140 and 142 which are inclined to an optical axis 144 are incident on a diffraction grating 146. White light incident at angles up to and including those of the rays 140 and 142 give rise to a cone 148 of undiffracted white light. First order diffraction of the rays 140 and 142 produces divergent dispersed beams 150 and 152. The rays 140 and 142 also define the field of view, which is restricted by the need to block undiffracted light.

The first order dispersion introduced by the grating 146 is sufficient to ensure that the undiffracted light 148 is angularly separated from the diffracted beam 150 which is closest to it. An optical stop (not shown) is positioned to limit the acceptance angle of the field of view thus defining the directions of the rays 140 and 142. A further optical stop (not shown) is positioned after the grating 146 to block undiffracted light without affecting diffracted light. The more remote diffracted beam 152 should have a maximum angle of diffraction at maximum wavelength which is less than 90° and preferably 60°±5°. The latter provides for the invention to be amenable to construction in compact form.

Figure 7:
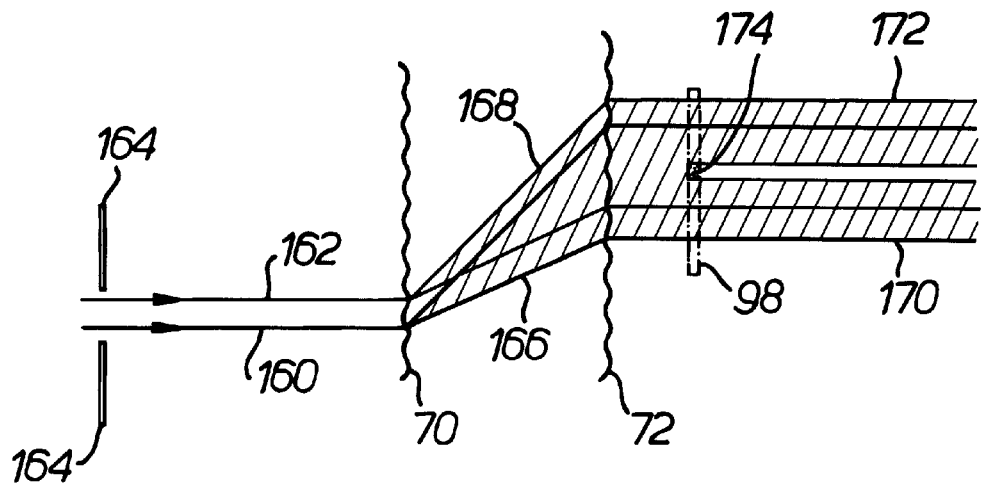
FIG. 7 illustrates input aperture and stop width criteria in a device of the invention.

Referring now to FIG. 7, the arrangement illustrated in FIG. 4 is shown once more, like references being employed. In this case, however, the drawing shows parallel white light rays 160 and 162 from one point in a scene passing from an input aperture 164 of finite width to the first grating 70. The rays 160 and 162 give rise to respective divergent dispersed beams 166 and 168 and parallel dispersed beams 170 and 172. Opaque pixels such as 174 in the stop 98 block respective wavelength intervals from the parallel dispersed beams 170 and 172. By considering rays from other points in the scene, it can be shown that there is a price to be paid for blocking a monochromatic source in a scene region; it results in different wavelength intervals being blocked from other scene regions. However, in practice, the stop 98 will only remove a small proportion of the image spectrum; this leaves a much greater proportion of the spectrum from each scene location to provide an image. Use of the invention therefore does not introduce blank positions in a scene.

The size of the input aperture 164 determines the minimum size of the stop 98. The stop 98 should be at least as wide as the separation between the outermost rays of the beams 170 and 172. The wavelength blocking discrimination of the arrangement shown in FIG. 7 is determined by the combination of the grating dispersion at the stop 98 and the extent of the opaque region or regions produced by opaque pixels such as 174. Moreover, the size of the aperture 164 over which wavelength selective blocking is obtainable is determined by the separation and size of the gratings 70 and 72.

Figure 8:
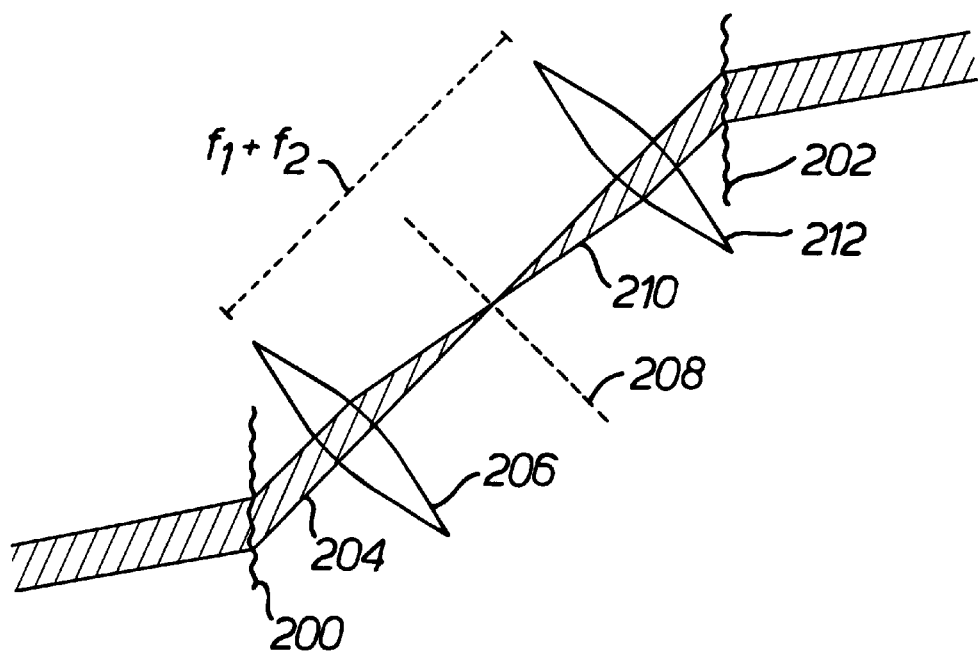
FIG. 8 schematically shows an intermediate focus between dispersing elements.

Referring now to FIG. 8, the dispersive elements of a device (not shown) of the invention are shown once more, these being first and second gratings 200 and 202. Parallel light 204 transmitted by the first grating 200 is focussed by a first lens 206 at an intermediate focal plane 208. Light 210 diverging from the focal plane 208 is rendered parallel by a second lens 212, the lenses 206 and 212 being separated by the sum of their focal lengths $f_1$ and $f_2$ respectively. Parallel light from the second lens 212 passes to the second grating 202 for diffraction.

The arrangement shown in FIG. 8 forms part of an imaging system having a number of advantageous features. A blocking optical stop may be located in the intermediate focal plane 208; its minimum size is set by the size in the plane 208 of the focussed spot image of a point source. This stop size is smaller than would be required were the size to be set by the imaging system aperture. The provision of the intermediate focal plane 208 also allows other spatial filtering devices and/or non-linear optical components to be positioned therein. Positioning of a non-linear optical component in the focal plane 208 provides capability for protection against damage as well as anti-dazzle properties. As compared to gratings in earlier embodiments, the gratings 200 and 202 may be implemented with increased dispersion without requiring increased size, since they have like apertures.

Figure 9:
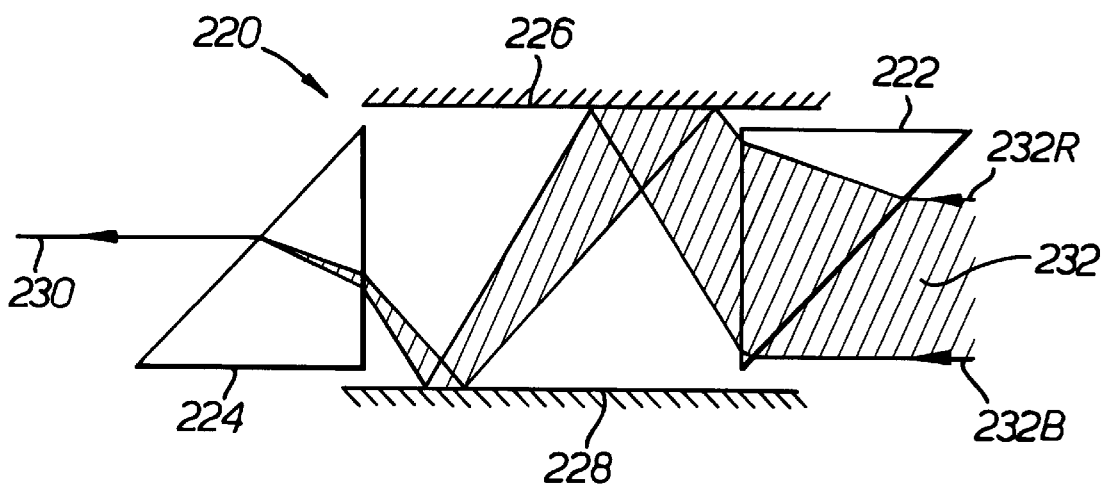
FIG. 9 illustrates use of a folded path optical system.

Referring now to FIG. 9, there is shown an optically dispersive system 220 suitable for use in a device of the invention. The system 220 offers a more compact alternative to the combination of prisms 14 and 16 in FIG. 1. It incorporates first and second prisms 222 and 224, the latter being arranged to counteract the dispersion introduced by the former. First and second plane mirrors 226 and 228 are arranged to provide for reflection of light from the first prism to the second.

A white light ray 230 leaving the second prism 224 (equivalent to ray 28 in FIG. 1) corresponds to a spatially and spectrally dispersed beam 232 entering the system 220. The beam 232 has red and blue rays 232R and 232B. It is dispersed by the first prism, reflected at the first and second mirrors in succession, and then counter-dispersed by the second prism 224. An optical stop (not shown) may be located at an input aperture, of the device 220. An equivalent folded path device may be constructed which incorporates gratings instead of prisms. The embodiments of the invention hereinbefore described have employed first and second dispersive elements, ie a pair of diffraction gratings or a pair of prisms. Examples employing prisms may use gratings instead and vice versa. The second dispersive element counteracts the angular dispersion of the first. This leaves spatial dispersion without a degree of angular dispersion sufficient to degrade system optical properties unacceptably. When employed in an imaging system, angular dispersion should be counteracted to a degree at which optical aberrations become of acceptable proportions. However, the invention may be employed in non-imaging applications in which optical aberrations are relatively unimportant. For example, the invention may be employed as part of a spectrometer to remove unwanted intense wavelengths from a spectrum.

The invention is not restricted to use of a pair of prisms or a pair of diffraction gratings. It may be convenient and desirable to obtain the dispersive functions of these pairs of devices by other optical means. The general requirement is for spectral dispersing apparatus which provides spatial dispersion but which counteracts angular dispersion normally associated therewith.

The foregoing description has discussed blockage of a single monochromatic source. The invention may also be arranged to block a white light source, but then that source will not be imaged because no residual radiation at unblocked wavelengths remains to do so. The invention may also be arranged to block either a single source emitting on a number of discrete wavelength intervals, or multiple sources emitting on discrete wavelengths. It is not restricted to the visible region of the spectrum, operation in the infra-red or ultraviolet is also possible.

Embodiments described have employed one dimensional spectral dispersion and spatial light modulation. A two-dimensional spatial light modulator may be used in order to reduce unnecessary removal of light from the image. Such a modulator may be located at an intermediate focal plane as shown at 208 in FIG. 8. It is also possible to employ optical light path directions and optical stop locations other than those described. In FIG. 2 for example, the light propagation direction may be reversed so that input radiation becomes represented by 56B and 56R, and output radiation by 50.

Figure 10:
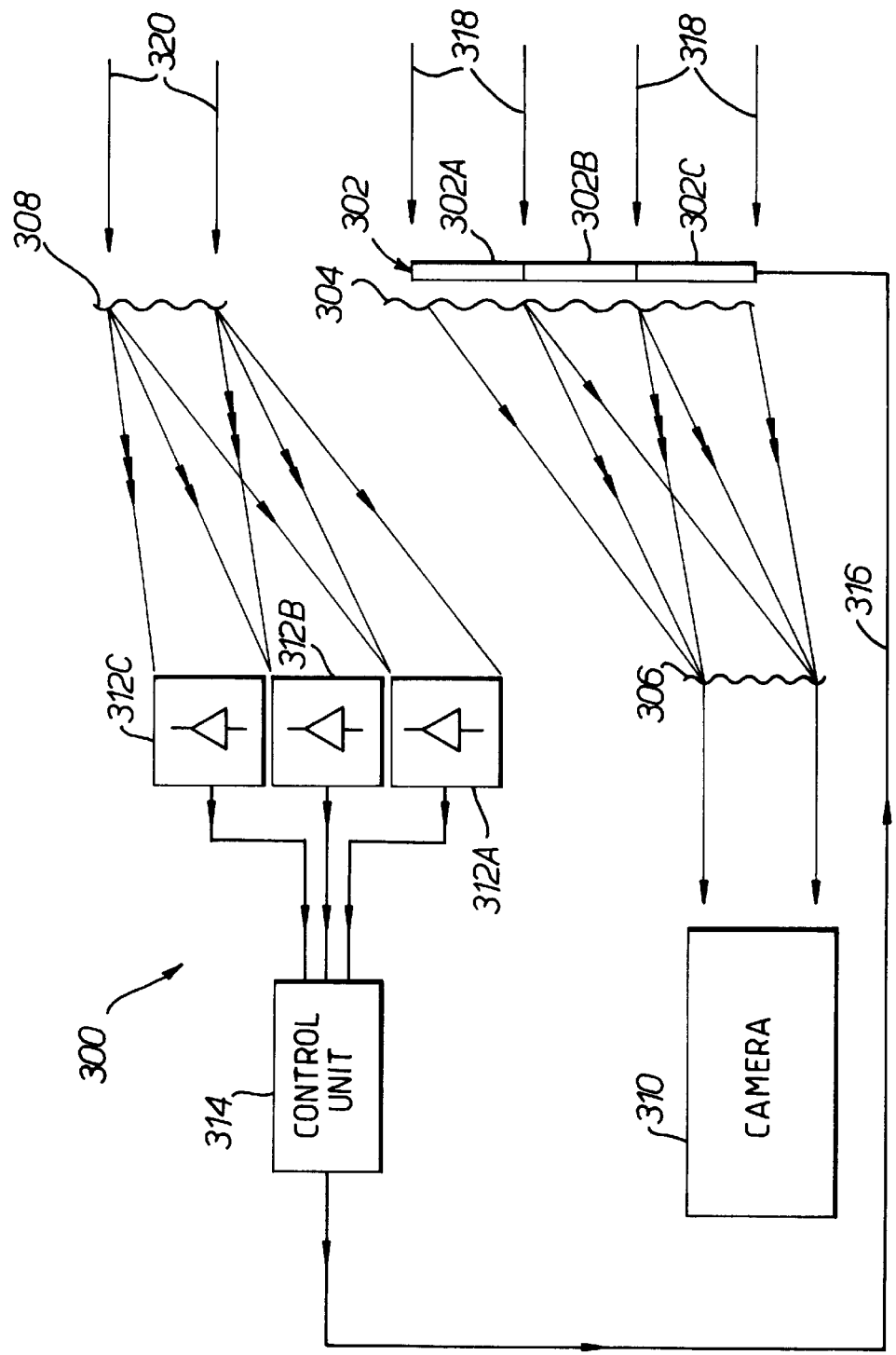
FIG. 10 illustrates an alternative means for feedback control in a device of the invention.

Referring to FIG. 10, there is schematically shown a further device of the invention indicated generally by 300; this device provides an alternative means for feedback control of an optical stop. The device 300 incorporates an optical stop 302, first and second diffraction gratings 304 and 306, a subsidiary diffraction grating 308 and a camera 310. The second and subsidiary gratings 306 and 308 have like size and line spacing. Three photodetector diodes 312A, 312B and 312C (collectively referred to as 312) are positioned to receive diffracted light from the subsidiary grating 308 and supply output signals to a control unit 314. The unit 314 supplies control signals via a line 316 to each of the pixels of the stop 302; of these pixels three are shown as 302A, 302B and 302C.

The device 300 operates equivalently to the device 10 described with reference to FIG. 1, with the exception that elements 308, 312 and 314 form a control loop which provides an alternative means for providing a control signal to the stop 302. Operation of the first and second gratings 304 and 306 and camera 308 will therefore only be described in outline. White light indicated by arrows 318 passes from a scene (not shown) to the first grating 304 via the stop 302. The second grating 306 counteracts the angular dispersion of the first; by virtue of collimation at the camera 310, this camera receives (broadly speaking) red light from the first pixel 302A, green light from the second pixel 302B, and blue light from the third pixel 302C.

The subsidiary grating 308 is equivalent to the second grating 306 operated in reverse. In consequence, the lowermost photodetector diode 312A receives red light, which undergoes the greatest diffraction and corresponds to the uppermost pixel 302A. White light 320 from the scene referred to above is angularly dispersed by the subsidiary grating 308 and falls on the diodes 312. The diodes 312 are separated from the subsidiary grating by the same distance as that between the first and second gratings 304 and 306. In consequence, each of the diodes 312 receives the same wavelength interval of light from the scene as that received by the camera 310 through a respective pixel 302; ie diode 312X receives and detects light of a wavelength interval equivalent to that to which pixel 302X corresponds, where X is A, B or C. If any of these wavelength intervals contains an undesirably intense region, the associated diode output signal is registered by the control unit 314, and a control signal passes to the associated pixel 302A, 302B or 302C as appropriate to darken it. This provides feedback control reducing dazzle in an imaged scene at the camera 310.

The use of a comparatively large area first diffraction grating 304 followed by a smaller area second grating 306 is beneficial because it gives high light collection efficiency. Interchange of these gratings' positions results in reduced efficiency.

The size of the subsidiary optical system defined by elements 308 and 312 may be scaled down compared to that defined by gratings 304 and 306. This is because the subsidiary system is needed only to detect intense light sources, as opposed to image forming in possibly low light conditions.

What is claimed is:

1. An optical filtering device for removing only a portion of wavelength interval from a beam of light, said device comprising:
    dispersing means for providing spatial dispersion of said beam as a function of wavelength without substantial angular dispersion; and
    a stop for providing blocking of at least said wavelength interval from at least one direction of radiation incident on the device.

2. A device according to claim 1 including means for forming an image from radiation which has undergone spatial dispersion and wavelength interval blockage.

3. A device according to claim 1 wherein the dispersing means comprises a first spectrally dispersing element and a second spectrally dispersing element, said second spectrally dispersing element comprising a means for counteracting any angular dispersion of said beams introduced by the first element.

4. A device according to claim 3 including reflecting means arranged to define a folded light path.

5. A device according to claim 3 wherein the dispersing element are diffraction gratings and including at least one subsidiary stop arranged to inhibit unwanted radiation from reaching an image forming means.

6. A device according to claim 3 including means for producing an intermediate focus in an optical path between the first and second dispersing elements.

7. An optical filtering device for removing only a portion of a wavelength interval from a beam of light, said device comprising:
    dispersing means for providing spatial dispersion of said beam as a function of wavelength without substantial angular dispersion; and
    a stop for providing blocking of at least said wavelength interval from at least one direction of radiation incident on the device
    wherein the dispersing means comprises a first spectrally dispersing element and a second spectrally dispersing element, said second spectrally dispersing element comprising a means for counteracting angular dispersion of said beams introduced by the first element
    wherein the variable stop is an electronically controlled spatial light modulator.

8. A device according to claim 7 including image forming means for providing feedback control over obscuration introduced by the spatial light modulator for selective attenuation of radiation from a monochromatic source producing dazzle in an imaged scene.

9. A device according to claim 1 wherein the stop is an electronically controlled spatial light modulator.

10. A device according to claim 2 wherein the dispersing means comprises a first spectrally dispersing element and a second spectrally dispersing element, said second spectrally dispersing element comprising a means for counteracting any angular dispersion of said beams introduced by the first element.

11. An optical filtering device for removing a wavelength interval from a selected beam of light, said beam being one of a plurality of beams incident on said device, and said device comprising:
    dispersing means for providing spatial dispersion of said plurality of beams wherein said spatial dispersion is a function of both wavelength and direction of entry of each of said plurality of beams into said dispersing means; and
    a stop for providing blocking of at least said wavelength interval from said selected beam incident on said dispersing means while leaving substantially unaffected (1) said wavelength interval from said plurality of beams, not including said selected beam, incident from other directions and (2) other wavelengths from said selected beam.

12. An optical filtering device for removing a wavelength interval from a selected beam of light, said beam being one of a plurality of beams entering the device from respective directions and emanating from respective points in a scene, said device comprising:
    dispersing means for providing spatial dispersion of said plurality of beams as a function of both wavelength and entry direction of said beams; and
    a stop for providing blocking of at least said wavelength interval from said selected beam incident on said dispersing means while leaving substantially unaffected (1) said wavelength interval from said plurality of beams, not including said selected beam, incident from other directions and (2) other wavelengths from said selected beam.

13. An optical filtering device for removing a wavelength interval from a selected beam of light, said beam being one of a plurality of beams incident on said device, said device comprising:
    dispersing means for providing spatial dispersion of said plurality of beams wherein said spatial dispersion is a function of both wavelength and direction of entry of each of said plurality of beams into said dispersing means;
    a stop for providing blocking of at least said wavelength interval from said selected beam incident on said dispersing means while leaving substantially unaffected (1) said wavelength interval from said plurality of beams, not including said selected beam, incident from other directions and (2) other wavelengths from said selected beam; and
    means for forming an image from radiation which has undergone spatial dispersion and wavelength interval blockage, wherein said dispersing means comprises a first spectrally dispersing element and a second spectrally dispersing element, said second spectrally dispersing element comprising a means for counteracting angular dispersion of said beams introduced by the first element.

14. An optical filtering device for removing a wavelength interval from a selected beam of light, said beam being one of a plurality of beams entering the device from respective directions and emanating from respective points in a scene, said device comprising:
    an optical dispersion system for providing spatial dispersion of said plurality of beams as a function of both wavelength and entry direction of said beams but without substantial angular dispersion thereof; and
    a stop for providing blocking of at least said wavelength interval from said selected beam incident on said optical dispersion system while leaving substantially unaffected (1) said wavelength interval from said plurality of beams, not including said selected beam, incident from other directions and (2) other wavelengths from said selected beam.

15. An optical filtering device for removing a wavelength interval from a selected beam of light, said beam being one of a plurality of beams incident on said device, said device comprising:

an optical dispersion system for providing spatial dispersion of said plurality of beams wherein said spatial dispersion is a function of both wavelength and direction of entry of each of said plurality of beams into said optical dispersion system;

a stop for providing blocking of at least said wavelength interval from said selected beam incident on said optical dispersion system while leaving substantially unaffected (1) said wavelength interval from said plurality of beams, not including said selected beam, incident from other directions and (2) other wavelengths from said selected beam; and imaging apparatus for forming an image from radiation which has undergone spatial dispersion and wavelength interval blockage, wherein said optical dispersion system comprises a first spectrally dispersing element and a second spectrally dispersing element, said second spectrally dispersing element comprising a structure for substantially eliminating angular dispersion of said beams but without substantial angular dispersion thereof introduced by the first element.

* * * * *